United States Patent
Avanes et al.

(10) Patent No.: US 11,763,029 B2
(45) Date of Patent: *Sep. 19, 2023

(54) DATA CLEAN ROOMS USING DEFINED ACCESS WITH HOMOMORPHIC ENCRYPTION

(71) Applicant: Snowflake Inc., Bozeman, MT (US)

(72) Inventors: Artin Avanes, Palo Alto, CA (US); Thierry Cruanes, San Mateo, CA (US); Monica J. Holboke, Toronto (CA); Allison Waingold Lee, Pebble Beach, CA (US); Subramanian Muralidhar, Mercer Island, WA (US); David Schultz, Piedmont, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/162,506

(22) Filed: Jan. 31, 2023

(65) Prior Publication Data
US 2023/0177210 A1     Jun. 8, 2023

Related U.S. Application Data

(63) Continuation of application No. 18/060,504, filed on Nov. 30, 2022, which is a continuation-in-part of application No. 18/051,457, filed on Oct. 31, 2022.
(Continued)

(51) Int. Cl.
*H04L 29/06* (2006.01)
*G06F 21/62* (2013.01)
*G06F 21/53* (2013.01)

(52) U.S. Cl.
CPC .......... *G06F 21/6245* (2013.01); *G06F 21/53* (2013.01); *G06F 2221/032* (2013.01)

(58) Field of Classification Search
CPC . G06F 21/6245; G06F 21/53; G06F 2221/032
See application file for complete search history.

(56) References Cited

U.S. PATENT DOCUMENTS

| | | | |
|---|---|---|---|
| 2013/0097417 A1* | 4/2013 | Lauter | H04L 9/008 713/150 |
| 2020/0160388 A1* | 5/2020 | Sabeg | G06Q 30/0269 |

(Continued)

OTHER PUBLICATIONS

"International Application Serial No. PCT US2023 023407, International Search Report dated Jul. 10, 2023", 3 pages.
(Continued)

*Primary Examiner* — Shin-Hon (Eric) Chen
(74) *Attorney, Agent, or Firm* — Schwegman Lundberg & Woessner, P.A.

(57) ABSTRACT

A data platform creates an application in a data-provider account, where the application includes one or more application programming interfaces (APIs) corresponding to one or more underlying code blocks. The data platform shares homomorphically encrypted provider data with the application in the data-provider account. The data platform installs, in a data-consumer account, an application instance of the application. The data platform shares homomorphically encrypted consumer data with the application instance in the data-consumer account. The data platform invokes one or more of the APIs of the application instance to execute respective associated underlying code blocks, which are not visible to the data-consumer account, and which operate on the shared homomorphically encrypted provider data and the shared homomorphically encrypted consumer data. The data platform saves homomorphically encrypted output of the one or more respective associated underlying code blocks locally within the data-consumer account.

24 Claims, 11 Drawing Sheets

Related U.S. Application Data

(60) Provisional application No. 63/366,316, filed on Jun. 13, 2022.

(56) References Cited

U.S. PATENT DOCUMENTS

| | | | |
|---|---|---|---|
| 2020/0294056 A1* | 9/2020 | Patel | G06Q 20/3821 |
| 2021/0119794 A1* | 4/2021 | Shpurov | G10L 15/1822 |
| 2022/0075878 A1* | 3/2022 | Begg | G06F 21/602 |
| 2022/0126210 A1* | 4/2022 | Kumar | G06T 15/005 |
| 2022/0140997 A1* | 5/2022 | Lam | H04L 9/008 |
| | | | 713/168 |
| 2023/0053566 A1* | 2/2023 | Horne | G06F 21/6227 |

OTHER PUBLICATIONS

"International Application Serial No. PCT US2023 023407, Written Opinion dated Jul. 10, 2023", 3 pages.

U.S. Appl. No. 18/051,457, filed Oct. 31, 2022, Data Clean Rooms Using Defined Access.

U.S. Appl. No. 18/060,504, filed Nov. 30, 2022, Data Clean Rooms Using Defined Access in Trusted Execution Environment.

U.S. Appl. No. 18/217,163, filed Jun. 30, 2023, Data Clean Rooms Using Defined Access With Homomorphic Encryption.

* cited by examiner

DATA-PROVIDER DATA TABLE

| CUST_ID | EMAIL | VIEWED_AD01 | VIEWED_AD02 | ... | VIEWED_AD[M] |
|---|---|---|---|---|---|
| 1 | name01@domain01.net | FALSE | TRUE | ... | [TRUE\|FALSE] |
| 2 | name02@domain02.net | TRUE | TRUE | ... | [TRUE\|FALSE] |
| 3 | name03@domain03.net | TRUE | TRUE | ... | [TRUE\|FALSE] |
| 4 | name04@domain01.net | FALSE | TRUE | ... | [TRUE\|FALSE] |
| ... | ... | ... | ... | ... | ... |
| N | [EMAIL] | [TRUE\|FALSE] | [TRUE\|FALSE] | ... | [TRUE\|FALSE] |

400

DATA-CONSUMER DATA TABLE

| CUST_ID | EMAIL | BOUGHT_PRODUCT01 | BOUGHT_PRODUCT02 | ... | BOUGHT_PRODUCT[L] |
|---|---|---|---|---|---|
| ... | ... | ... | ... | ... | ... |
| 46 | name01@domain01.net | TRUE | TRUE | ... | [TRUE\|FALSE] |
| 47 | name02@domain02.net | FALSE | TRUE | ... | [TRUE\|FALSE] |
| 48 | name48@domain48.net | TRUE | FALSE | ... | [TRUE\|FALSE] |
| 49 | name03@domain03.net | TRUE | TRUE | ... | [TRUE\|FALSE] |
| 50 | name04@domain01.net | FALSE | FALSE | ... | [TRUE\|FALSE] |
| 51 | name51@domain51.net | FALSE | FALSE | ... | [TRUE\|FALSE] |
| ... | ... | ... | ... | ... | ... |
| K | [EMAIL] | [TRUE\|FALSE] | [TRUE\|FALSE] | ... | [TRUE\|FALSE] |

DATA CLEAN ROOMS USING DEFINED ACCESS WITH HOMOMORPHIC ENCRYPTION

CROSS-REFERENCE TO RELATED APPLICATIONS

This application is a continuation of U.S. patent application Ser. No. 18/060,504, filed Nov. 30, 2022 and entitled "Data Clean Rooms Using Defined Access In Trusted Execution Environment," which is a continuation-in-part of U.S. patent application Ser. No. 18/051,457, filed Oct. 31, 2022 and entitled "Data Clean Rooms Using Defined Access," which claims the benefit of U.S. Provisional Patent Application No. 63/366,316, filed Jun. 13, 2022 and entitled "Data. Clean Rooms Using Defined Access," each of which are hereby incorporated by reference into the present disclosure in their respective entireties.

TECHNICAL FIELD

Among other technical fields, embodiments of the present disclosure pertain to managing access to shared data.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, a data platform may include one or more databases that are respectively maintained in association with any number of customer accounts. It may occur from time to time that users associated with two different customer accounts wish to share data with one another. It can be challenging, however, to do so in a secure and scalable manner.

A given data platform may also include one or more databases that are maintained in connection with one or more system (e.g., administrative) accounts of the data platform, one or more other databases used for administrative purposes, and/or one or more other databases that are maintained in association with one or more other organizations and/or for any other purposes. A data platform may store metadata in association with the data platform in general and in association with particular databases and/or particular customer accounts as well. Metadata that is maintained by a data platform with respect to stored data (e.g., stored customer data) may be referred to herein at times as "expression properties."

Users and/or executing processes (that may be associated with, e.g., a given customer account) may, via one or more types of clients, be able to cause data to be ingested into one or more databases in the data platform, and may also be able to manipulate the data, run queries against the data, create customized views (which are also known as secure views) of the data, modify the data, insert additional data, remove data, and/or the like. Some example types of clients include web interfaces, Java Database Connectivity (JDBC) drivers, Open Database Connectivity (ODBC) drivers, one or more other types of drivers, desktop applications, mobile apps, and the like.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 4 illustrates an example data-provider data table and an example data-consumer data table, in accordance with at least one embodiment.

DETAILED DESCRIPTION

Figure 1:
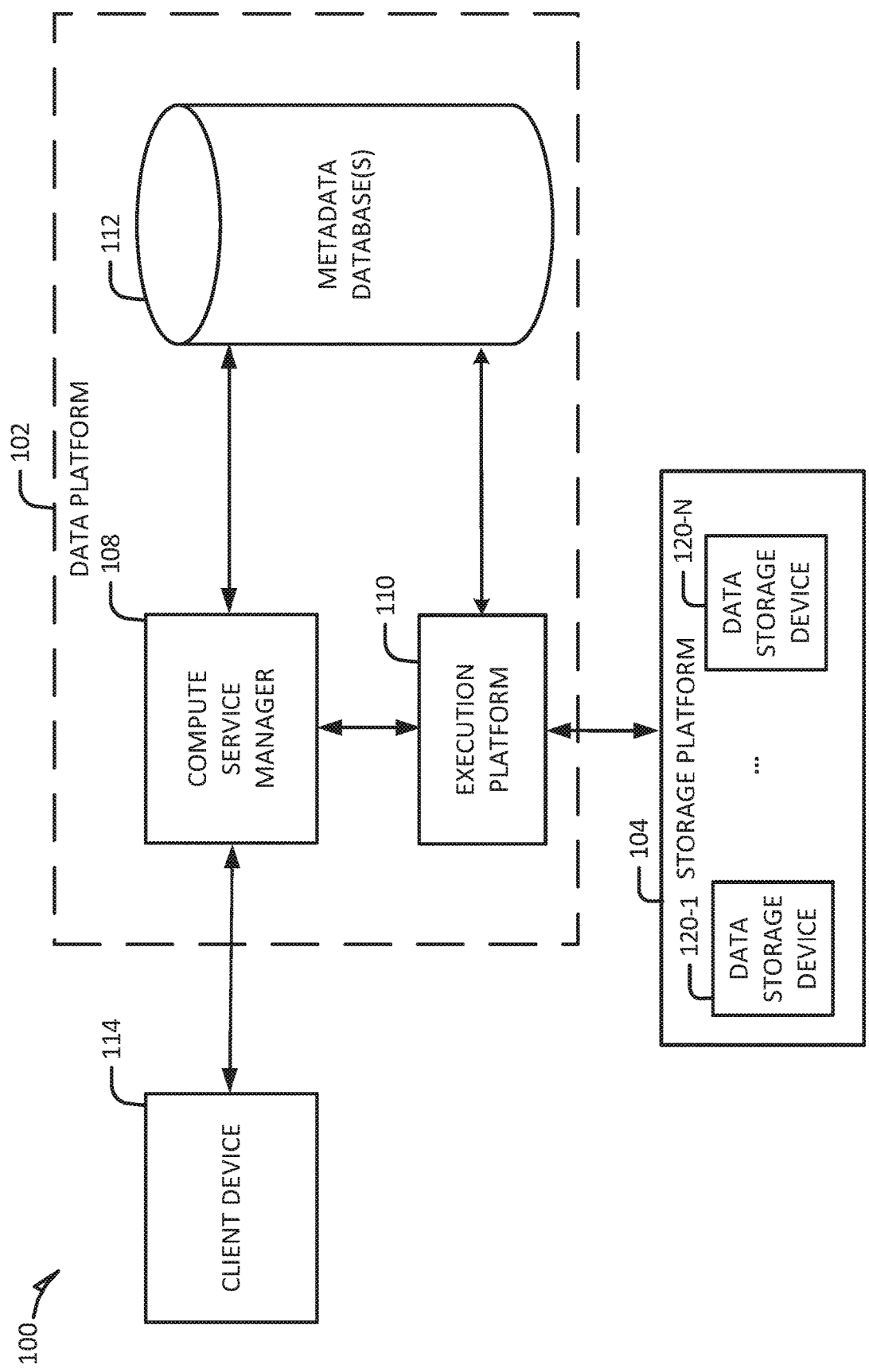
FIG. 1 illustrates an example computing environment in which a data platform may provide data clean rooms, in accordance with at least one embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Data clean rooms enable two or more parties to share data, while restricting how that data can be used by other parties. In one example scenario, two or more parties wish to combine their respective data without revealing their raw data to each other. For example, two companies may wish to determine how many joint customers they have, but neither company wants to give the other one access to its customer list. A data clean room can be established for processing a join of a customer list from one company with a customer list from the other company, using a field such as mobile phone number or email address as a join key, as an example.

Each company may share its respective customer list with the other company via a data clean room, within which the aforementioned join can be executed, and a total number of rows in the resulting relation can be conveyed back to each party. In that manner, neither company ever has access to the actual customer data on the other's list, but each company can find out the number of common customers between the two companies. In an example such as this, the data clean room may be resident in a database-platform account of either company or in a mutually agreed-upon location that is in neither database-platform account, and each company may confidentially share its customer list (or perhaps just one or more columns of its customer list) with the data clean room, within which the join function may be carried out.

The above-described example relates in many instances to a two-way-sharing model i.e., each company shares its customer list with the other to at least some extent. There are other scenarios, however, in which the data-sharing model is more of a one-way street. This disclosure includes description of example data-clean-room operation in some such example scenarios. In this disclosure, the sharing relationship is described as being between (i) a company (or organization or an individual, etc.) that is referred to herein as a "data provider" and (ii) a company (or, again, an organization or an individual, etc.) that is referred to herein as a "data consumer." As one would expect from those names, a given data provider provides data that is consumed by one or more data consumers. In the examples that are primarily described below in connection with the figures, the data provider is a streaming-video platform that presents advertisements ("ads") in conjunction with the streaming video that it provides, and the data consumer is a particular advertiser that advertises on that streaming service.

Embodiments of the present disclosure are described herein as using data clean rooms that are constructed and operated according to what is referred to herein as "defined access" (or "a defined-access model," "a defined-access paradigm," "a defined-access approach," and/or the like). In at least one embodiment, a data provider creates an application. In some embodiments, the application may be what is referred to in the present disclosure as a "native platform application," which, as used herein, refers to an application that is "built in" to i.e., executes on the herein-described data platform. Generally speaking, any suitable type of application can be used in a given embodiment of the present disclosure; the mention of native platform applications in the previous sentence is by way of example only.

In some of the described examples, both the data providers and the data consumers are customers of a common data platform, and accordingly each have a respective customer account (or just "account") on that data platform. In other embodiments, a given data provider and a given data consumer operate on separate platforms. Either or both of the separate platforms could be platforms operated by the data provider or data consumer themselves, or could be a customer account held by the data provider or the data consumer on another multi-customer data platform. And certainly other architectures are possible as well.

In at least one embodiment in which the data provider and the data consumer operate their own respective platform, it may be the case that neither fully trusts the other to fully implement what each party deems to be the appropriate security measures. In one or more embodiments, both the data provider and the data consumer may place their trust in what is known as a trusted execution environment (TEE). An example TEE could be a secure enclave, a confidential virtual machine (VM), or another option deemed suitable by those of skill in the art having the benefit of the present disclosure. These embodiments are referred to herein at times as "TEE embodiments."

Moreover, in some embodiments in which the data provider and the data consumer operate their own respective platform, the data provider and the data consumer use cryptographic protection of their data in use (e.g., during computations). These embodiments are discussed below in connection with FIG. 9 and FIG. 10, and are referred to in the present disclosure at times as "cryptography embodiments." It is noted that the data provider and the data consumer may also use cryptographic protection of their data at rest and/or their data in transit. Lastly, embodiments in which both the data provider and the data consumer have accounts on a common data platform may be referred to herein at times as "common-platform embodiments."

In at least one TEE embodiment, an application having one or more APIs as described herein may execute on a given TEE. The data provider may provide the application and may share certain of the data provider's data with that application. An instance of that application may then be installed in the TEE, and the data consumer may share certain of the data consumer's data with that application instance. In some embodiments, both the data provider and the data consumer share their respective data with the installed application instance. Other architectures are possible as well and may occur to those of skill in the art having the benefit of the present disclosure. Some TEE embodiments are further discussed below in connection with FIG. 7 and FIG. 8.

In at least one cryptography embodiment, the data provider may provide an application having one or more APIs as discussed herein, and may share certain of the data provider's data with that application on the data provider's platform (i.e., "the data-provider platform"). An instance of that application may be installed on the data consumer's platform (i.e., "the data-consumer platform"), and the data consumer may share certain of the data consumer's data with that application instance.

In some cryptography embodiments, the installed application instance may implement what is known in the art as fully homomorphic encryption (FHE) (or another type of homomorphic encryption). In such embodiments, both the data-provider data and the data-consumer data that are shared with the application instance may be homomorphically encrypted, and the one or more APIs of the installed application instance may operate on this homomorphically encrypted data, and return a homomorphically encrypted result to the data consumer for local decryption and storage on the data-consumer platform. In at least some such embodiments, both the data provider and the data consumer may homomorphically encrypt their respective data using a public key generated by the data consumer. The data consumer may share that public key with the data provider, though only the data consumer has the corresponding secret key needed to decrypt the results. Other encryption-based approaches can be used as well. Moreover, FHE can be used in multiple types of embodiments, including common-platform embodiments, TEE embodiments, and embodiments in which the data provider and the data consumer operate their own respective platform, as examples.

Returning for now to discussion of some example common-platform embodiments, a given application may reside in the data-platform account of a data provider (the "data-provider account"), and may include a set of application programming interfaces (APIs) that are associated with various underlying blocks of (e.g., source and/or executable) code provided by the given application. In at least some embodiments, these APIs define how data in the data-provider account ("provider data") may be accessed by any user that is executing an instance of the given application. The underlying code blocks may perform operations that include, but are not limited to, particular queries, particular query operations (e.g., joins), user-defined functions, other functions, stored procedures, scripts, user-interface elements, secure views, and/or the like. The data provider may share certain data with the application.

The data provider may further permit a data consumer to install an instance of the application. It is noted that there may be multiple data providers, multiple applications provided by a given data provider, multiple data consumers, multiple application instances installed by a given data consumer, and so forth. For simplicity, however, most of the examples that are described in the present disclosure involve a single data provider that has created a single application in the data-provider account of that data provider, and a single data consumer that installs a single instance of that application in the data-consumer account of that data consumer.

Once the data consumer has installed, in the data-consumer account, an instance of the application, the data consumer can thereafter use the one or more APIs provided by the data provider to access the provider data (to the extent permitted by the code underlying the APIs). Because the APIs are created by (or at least for) the provider, the APIs enforce the provider's intended restrictions on how provider data may be used. In at least one embodiment, the APIs themselves are visible to the data-consumer account, whereas the operational logic (e.g., source code, executable code, and/or the like) of the underlying code blocks is not. In at least some embodiments, the provider data is homomorphically encrypted, and the code underlying the APIs operates on that encrypted data.

In many examples, data consumers combine at least some of their own consumer data with the accessed provider data via the APIs, Thus, in some embodiments, the data provider shares certain provider data with the application, and also shares the application with the data consumer, whereas the data consumer shares at least some of its consumer data with the installed application instance. This arrangement protects the data of both parties, and in particular protects the consumer data, which is only being shared within the data-consumer account with the particular installed instance of the described application. Indeed, in at least one embodiment, the application is constructed such that it is not able to exfiltrate consumer data from the data-consumer account (absent authorization from the data consumer).

Moreover, in at least one embodiment, results computed by (or generated by, etc.) a given API are returned only locally within the data-consumer account within which that particular application instance has been installed and is executing. Furthermore, in at least one embodiment, the data consumer is protected in that both the provider data and the consumer data are homomorphically encrypted using a public key generated by the data consumer. The provider data and consumer data are operated on while encrypted, and the results are not only returned exclusively to the data consumer, but those results are also homomorphically encrypted with the data consumer's public key, where only the data consumer possesses the corresponding secret key needed to decrypt the results.

It is noted that, as used herein, "share" (or "sharing," etc.) is a broad verb that is intended to include mechanisms such as granting permissions, sending copies, sending links (e.g., customized links), and/or any other mechanism by which access to the party being shared with can be accomplished. In some cases, "sharing" involves granting permissions to one or more objects that may represent, e.g., a database, an application, an application instance, and/or the like.

Additionally, in at least one embodiment, data providers are equipped with one or more tools or other mechanisms that can be used to audit how one or more data consumers are accessing the provider data of that data provider. Some examples of auditable events include API invocations, stored-procedure invocations, accesses of certain tables, accesses of certain views, accesses of certain databases, accesses of certain objects, and/or the like. In some embodiments, data providers have the capability to revoke granted access (e.g., at will, or under certain conditions, etc.).

In some embodiments, an audit log (or other record) is generated to record various events. Such an audit log may include details of how the data provider's data was used—e.g., whether a particular column was used as a join key or filter, or directly returned to the data consumer, among other options. An audit log may include computation details, totals, and/or the like. For example, an audit log may include a value such as volume of data produced. Moreover, in embodiments in which a data consumer's query involves the data consumer's own data in addition to the data provider's data, an audit function may record only metrics and events related to the data consumer's access of the data provider's data, but not record metrics and events regarding how the data consumer may or may not have accessed their own data. This may protect privacy and confidentiality of the data consumer's data. Numerous other possibilities could be implemented as well or instead of one or more of the aforementioned options.

FIG. 1 illustrates an example computing environment 100 that includes a database system in the example form of a data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the data platform 102 in communication with a cloud storage platform 104 (e.g., AWS®, Microsoft Azure Blob Storage®, or Google Cloud Storage). The data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the data platform 102.

The data platform 102 comprises a compute service manager 108, an execution platform 110, and one or more metadata databases 112. The data platform 102 hosts and provides data reporting and analysis services to multiple client accounts.

The compute service manager 108 coordinates and manages operations of the data platform 102. The compute service manager 108 also performs query optimization and compilation as well as managing clusters of computing services that provide compute resources (also referred to as "virtual warehouses"), The compute service manager 108 can support any number of client accounts, such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the data platform 102, A user may utilize the client device 114 to submit data storage, retrieval, and analysis requests to the compute service manager 108.

The compute service manager 108 is also coupled to one or more metadata databases 112 that store metadata pertaining to various functions and aspects associated with the data platform 102 and its users. For example, metadata database(s) 112 may include a summary of data stored in remote data storage systems as well as data available from a local cache. Additionally, metadata database(s) 112 may include information regarding how data is partitioned and organized in remote data storage systems (e.g., the cloud storage platform 104) and local caches.

As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can include millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, avoiding those non-pertinent micro-partitions when responding to the query, and scanning only the pertinent micro-partitions to respond to the query.

Metadata may be automatically gathered on all rows stored in a micro-partition, including: the range of values for each of the columns in the micro-partition; the number of distinct values; and/or additional properties used for both optimization and efficient query processing. In one embodiment; micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata database 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3TM storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108, The set of processes can include: a first process to execute the query plan; a second process to monitor and delete cache files using a least recently used (LRU) policy and implement an out-of-memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments; these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112; execution platforms 110; and cloud storage platforms 104 may be implemented as a distributed system (e.g., distributed across multiple systems/platforms at multiple geographic locations), Additionally, each of the compute service managers 108; metadata databases 112; execution platforms 110; and cloud storage platforms 104 can be scaled up or down (independently of one another) depending on changes to the requests received and the changing needs of the data platform 102, Thus, in the described embodiments, the data platform 102 is dynamic and supports regular changes to meet the current data processing needs.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task.

Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
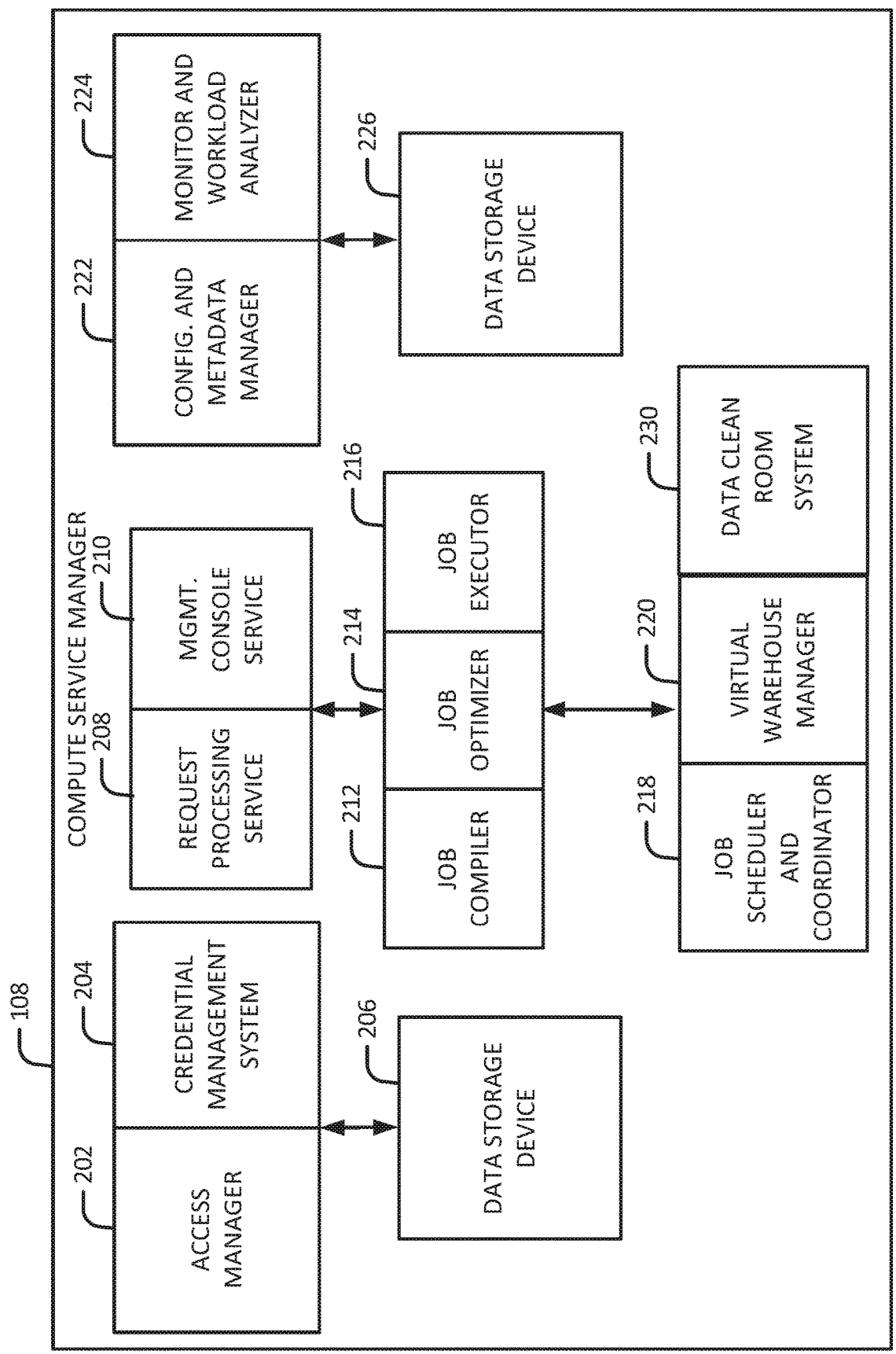
FIG. 2 is a block diagram illustrating components of a compute service manager, in accordance with at least one embodiment.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to access metadata database 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206), A remote credential store definition identifies a remote credential store and includes access information to access security credentials from the remote credential store, A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data), For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and then processed in that prioritized order. In an embodiment, the job scheduler and coordinator 218 determines a priority for internal jobs that are scheduled by the compute service manager 108 of FIG. 1 with other "outside" jobs such as user queries that may be scheduled by other systems in the database but may utilize the same processing resources in the execution platform 110, In some embodiments, the job scheduler and coordinator 218 identifies or assigns particular nodes in the execution platform 110 to process particular tasks, A virtual warehouse manager 220 manages the operation of multiple virtual warehouses implemented in the execution platform 110. For example, the virtual warehouse manager 220 may generate query plans for executing received queries. The data clean room system 230 is configured to perform online error checking and offline error checking, as discussed in further detail below, and is further configured to conduct the data-clean-room-related functions described in the present disclosure.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job, A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), but should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

Figure 3:
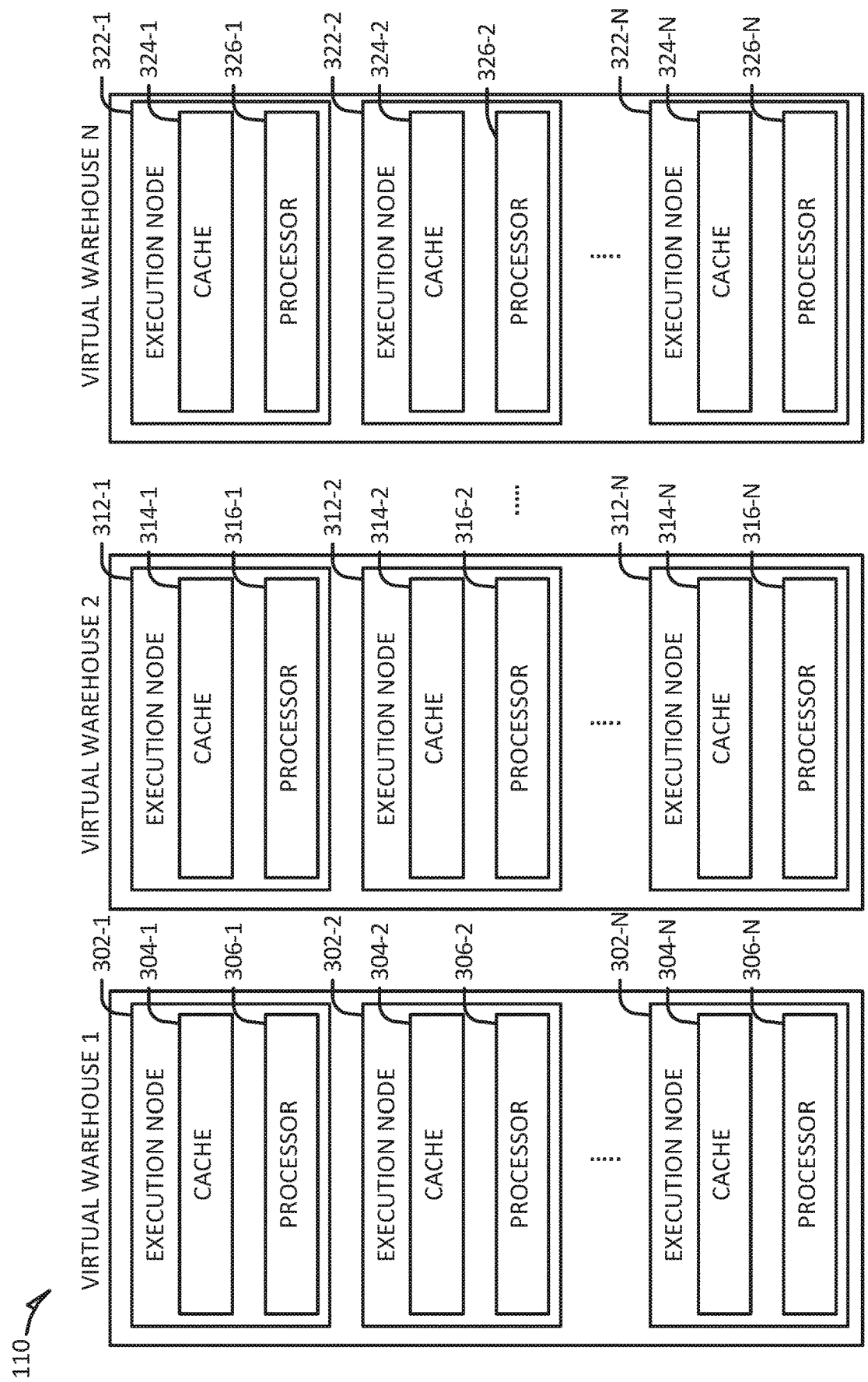
FIG. 3 is a block diagram illustrating components of an execution platform, in accordance with at least one embodiment.

FIG. 3 is a block diagram illustrating components of the execution platform 110 of FIG. 1, in accordance with some embodiments. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes.

As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104, Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1, Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node, Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive.

Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Further examples of embodiments are described below in connection with FIG. 4 through FIG. 10. In the first example scenario described below, a data provider and a data consumer are both customers of the data platform 102, and each has a respective account (e.g., customer account) with the data platform 102. These customer accounts may be maintained by the data platform 102 in the cloud storage platform 104. The example data provider is a streaming-video platform that presents advertisements in connection with presented video. The example data consumer is one particular advertiser that places ads on the streaming-video platform.

FIG. 4 illustrates an example data-provider data table 400 and an example data-consumer data table 450, in accordance with at least one embodiment. The data-provider data table 400 may be stored in the data-provider account, whereas the data-consumer data table 450 may be stored in the data-consumer account. The data content and arrangements presented in FIG. 4 are by way of example and not limitation, as other content and/or arrangements could be used.

The data-provider data table 400 has a header row and a row for each of a plurality of customers, and further has columns corresponding respectively to a customer ID and an email address. The data-provider data table 400 also includes columns for an arbitrary number M of advertisements. For each customer, an indication of 'true' or 'false' indicates whether or not the customer of that row has viewed (or has been presented, etc.) the ad of that column. Respective rows for an arbitrary number N of customers is shown in the data-provider data table 400.

The data-consumer data table 450 has a header row and a row for each of an arbitrary number K of customers of the data consumer, as well as columns corresponding to a customer ID and an email address. The data-consumer data table 450 further includes an arbitrary number L of columns that respectively contain 'true' or 'false' to indicate whether or not the customer of that row has purchased the product of that column. For simplicity, 'AD01' is an advertisement for 'PRODUCT01,' and 'AD02' is an advertisement for 'PRODUCT02.' The names PRODUCT01 and PRODUCT02 are simply placeholders, and could just as well represent a given service, a collection of products, and/or the like.

It can be seen from inspection of the data-provider data table 400 and the data-consumer data table 450 that there are four common customers between the two tables. In particular, customers 1-4 in the data-provider data table 400 correspond respectively to customers 46, 47, 49, and 50 in the data-consumer data table 450, The rows in the data-consumer data table 450 that correspond to those four example customers are marked with an arrow to the left of each such row. Moreover, it is noted that, in some embodiments, customers will only appear in a given table if they viewed a given ad or bought a given product thus, more of a transaction-log approach is used in some embodiments. Other approaches could be used as well, and may occur to those of skill in the art having the benefit of the present disclosure.

Figure 5:
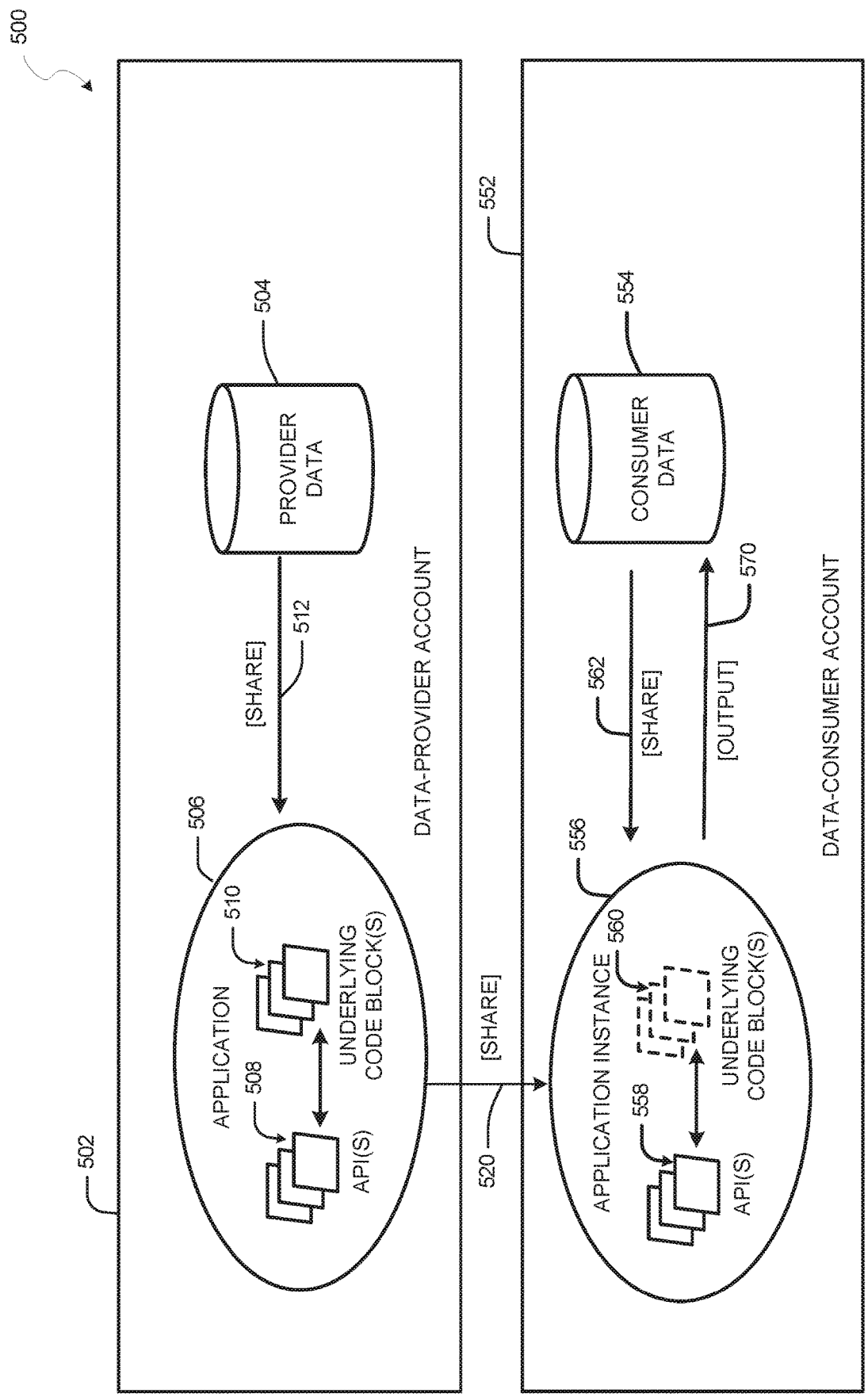
FIG. 5 depicts a first example defined-access data-clean-room scenario, in accordance with at least one embodiment.

FIG. 5 depicts an example defined-access data-cleanroom scenario 500, in accordance with at least one embodiment. Depicted in FIG. 5 are representations of (i) a data-provider account 502 corresponding with the above-described streaming-video platform and (ii) a data-consumer account 552 corresponding with the above-described advertiser. The data-provider account 502 includes provider data 504 and an application 506. The provider data 504 may include the data-provider data table 400 of FIG. 4. Furthermore, a share 512 is depicted to represent that at least some of the provider data 504 is shared with the application 506, In this example, the shared data is the data-provider data table 400.

Furthermore, the application 506 includes one or more APIs 508 that correspond with one or more respective underlying code blocks 510. These APIs 508 and associated underlying code blocks 510 could provide any of the operations described above, including queries, query operations (e.g., joins), user-defined functions, stored procedures, access to one or more secure views, generation of one or more user-interface elements, and/or the like. In at least one embodiment, the underlying code blocks 510 contain the source code and/or executable code that actually performs the operations that are accessible via the APIs 508.

A share 520 depicts that the data-provider account 502 is sharing the application 506 with the data-consumer account 552. In at least one embodiment, this involves permitting the installation in the data-consumer account 552 of an application instance 556 of the application 506. As can be seen in FIG. 5, the application instance 556 includes one or more APIs 558 that correspond to the one or more APIs 508 of the application 506. The APIs 558 respectively provide access to one or more underlying code blocks 560, which correspond to the one or more underlying code blocks 510 in the application 506. Whereas the underlying code blocks 510 (e.g., the underlying source code and/or executable code) are visible to the data-provider account 502, the underlying code blocks 560 are not visible to the data-consumer account 552—for this reason, the underlying code blocks 560 are depicted using dashed outlines in FIG. 5.

It can further be seen that the data-consumer account 552 contains consumer data 554 which, in this example, includes the above-described data-consumer data table 450 of FIG. 4. The share 562 that is depicted in FIG. 5 represents that the data-consumer account 552 is sharing at least some of the consumer data 554 with the application instance 556. It is noted with respect to both the provider data 504 and the consumer data 554 that their depiction as being respectively within the data-provider account 502 and the data-consumer account 552 are illustrative only, and do not necessarily reflect an actual storage location.

When the data-consumer account 552 uses one or more of the APIs 558 of the application instance 556, any output of these operations is depicted as being stored in the consumer data 554 of the data-consumer account 552. The security of the consumer data 554 is protected in at least two ways: it never leaves the data-consumer account 552, and even the resulting output 570 is locally stored in the data-consumer account 552. Furthermore, as described herein, the provider data 504, the consumer data 554, and the output 570 (i.e., results) may also be protected using homomorphic encryption.

Figure 6:
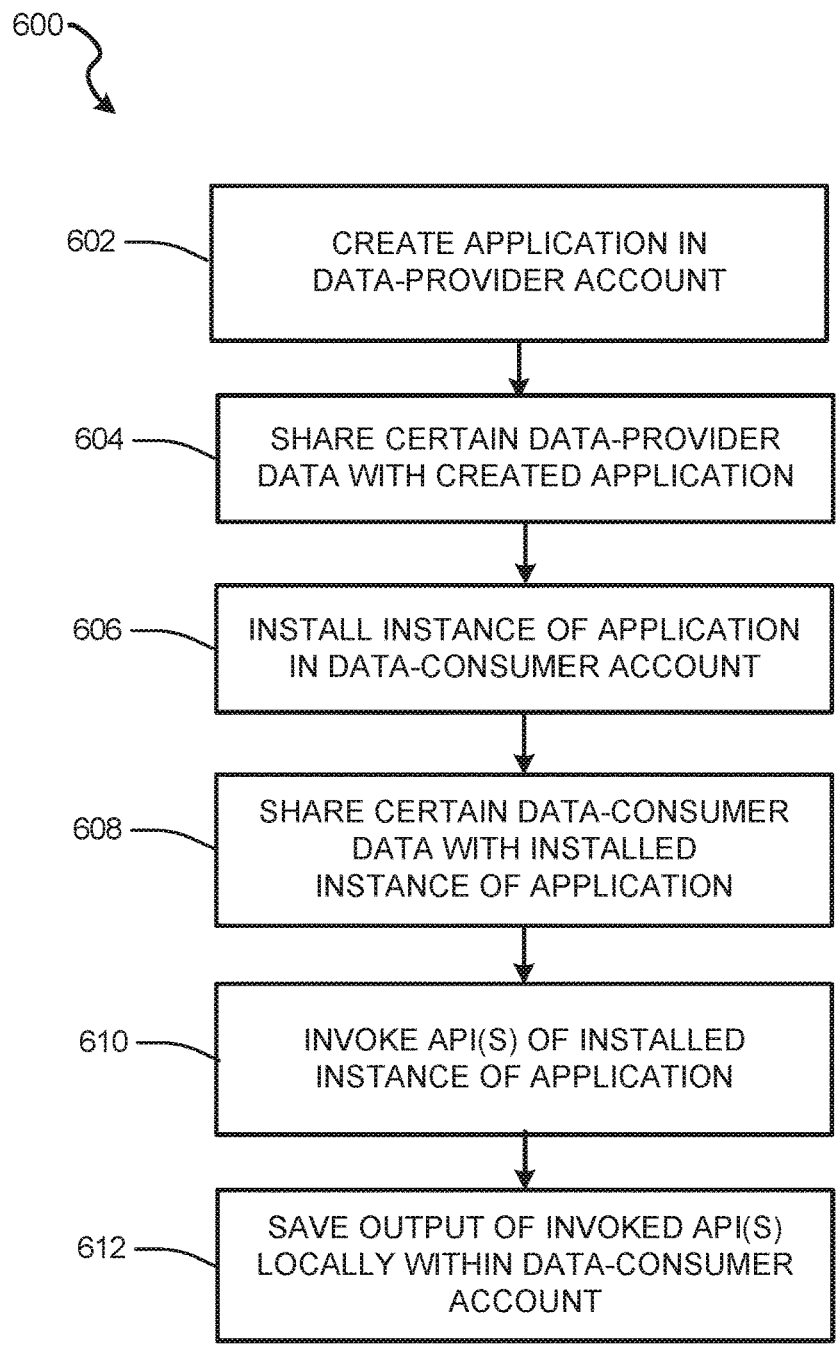
FIG. 6 shows a flow diagram of a first method for providing defined access in the context of a data clean room, in accordance with at least one embodiment.

FIG. 6 shows a flow diagram of a method 600 for providing defined access in the context of a data clean room, in accordance with at least one embodiment. The example method 600 is described by way of example as being performed by the data platform 102, though this is by way of example and not limitation. The method 600 could be performed by any one or more computing devices that are suitably, programmed to perform the described functions.

At operation 602, the data platform 102 creates the application 506 in the data-provider account 502 of the data platform 102. The application 506 includes the one or more APIs 508 corresponding to the one or more underlying code blocks 510.

At operation 604, the data platform 102 shares (at the share 512) certain provider data 504 (e.g., the data-provider data table 400) with the application 506.

At operation 606, the data platform 102 installs (in association with the share 520) an application instance 556 of the application 506 in the data-consumer account 552 of the data platform 102. The application instance 556 includes APIs 558 that correspond to the APIs 508, and that also correspond to the (non-visible) underlying code blocks 560, which themselves correspond to the underlying code blocks 510.

At operation 608, the data platform 102 shares (at the share 562) certain consumer data 554 (e.g., the data-consumer data table 450) with the application instance 556.

At operation 610, the data platform 102 invokes one or more of the APIs 558 of the application instance 556 of the application 506.

At operation 612, the data platform 102 saves the output 570 of the APIs 558 locally within the data-consumer account 552.

In an example embodiment, an API 558 may provide to the data-consumer account 552 a conversion rate that reflects the fraction of customers that viewed a given advertisement via the streaming-video service associated with the data-provider account 502—that actually went ahead and bought the advertised product (or service, etc.). With access to both the data-provider data table 400 and the data-consumer data table 450, the application instance 556 can compute a conversion rate on a product-by-product basis.

In the example data, it can be seen that advertisement 01 (corresponding to product 01) was viewed by the customers having the email addresses that start with 'name02' and 'name03.' it can further be seen that the 'name02' customer did not buy product 01, though the 'name03' customer did. A conversion rate of 0.5 (1 out of 2, 50%, etc.) may be locally returned within the data-consumer account 552 for product 01.

For product 02, it can be seen that all four customers that are explicitly listed in the data-provider data table 400 viewed advertisement 02. These four customers have email addresses starting with 'name01,' 'name02,' 'name03,' and 'name04' respectively. It can further be seen that the 'name01' customer, the 'name02' customer, and the 'name04' customer bought product 02, whereas the 'name03' customer did not. A conversion rate of 0.75 (3 out of 4, 75%, etc.) may be returned within the data-consumer account 552 for product 02.

The above example shows that some APIs may provide results that are a certain count, average, fraction, percentage, and/or the like that are computed using data from both the provider and the consumer. These operations thus anonymize the data by outputting only an aggregate (e.g., numerical) answer without exposing the underlying data from which that answer was computed.

In other cases, a relation (e.g., a table) may be returned locally within the data-consumer account 552. Depending on the functionality of the corresponding API, this relation may only be a subset of the consumer data that was shared by the data-consumer account 552 with the application instance 556.

In some embodiments, an API may apply a differential privacy noise parameter to return aggregate results that satisfy a specified epsilon value (i.e., privacy budget). Among other techniques, a given API may inject a specific amount of Laplace noise into the aggregate results, although other techniques exist.

Various different embodiments provide advantages over prior implementations. Some such advantages are described below. This list of advantages is intended to be illustrative and not limiting. Other advantages may occur to those of skill in the art having the benefit of the present disclosure.

Embodiments of the present disclosure give data providers flexibility in defining how they want their data to be accessed. For example, a data provider can create stored procedures and user-defined functions to enforce restrictions, One example context in which this may apply is in machine learning. In that context, the contents of a model can potentially reveal sensitive information about individuals, or reveal proprietary information about hyperparameters and other details regarding how a given model was trained. To limit such exposure, a data provider may wish to allow consumers to access the provider's machine-learning model only in certain ways. For example, a provider may allow a consumer to generate predictions, and optionally to contribute training data, without allowing the consumer to directly inspect the model. In such an embodiment, the provider creates APIs to access the model (i.e., "predict" API and optionally "train" API), and the consumer can only interact with the model via these APIs. Additionally, the provider can limit the number of predictions that the consumer can perform. A relevant use case is fraud detection in financial services: Banks wish to collaborate to build models to detect fraudulent consumers, but may be prevented by regulation and business interests from sharing raw consumer data with one another. Homomorphic encryption may be used in some embodiments related to machine-learning models.

At least one embodiment supports limiting the extent of a consumer's access to data. For example, an embodiment can keep state that tracks how many queries a consumer has issued, or the aggregate amount of data the consumer has retrieved, or the privacy loss metric in differential privacy, as examples. Based on these metrics, the data platform can restrict the consumer's access if too much data has been accessed, in total or over a discrete time period (rate-limiting), Other examples are possible as well. Moreover, in embodiments that utilize homomorphic encryption, limits can be placed on the number of calculations that may be performed, in order to keep the accumulating noise in the homomorphically encrypted data at a level at which the data consumer's secret key will still be operable to decrypt the results.

At least one embodiment supports global collaboration across clouds and geographical regions. When an authorized consumer wants to access data that a provider has shared, the data platform may automatically replicate the data to the region where it is needed, so that the consumer can install it as an application instance.

At least one embodiment supports collaboration across X parties, where X can be 2 or greater. In an X-party scenario, one party acts as the consumer, combining data from the X-1 other parties and optionally data from itself.

As mentioned above, in at least one embodiment, usage of installed application instances of applications are auditable. As a first example, a data platform can provide a generic audit mechanism in the form of a log of API calls. As a second example, a data platform can provide a logging facility that providers' code can invoke to log use-case-specific context, e.g., how much of the consumer's privacy budget is consumed by the current call. Other audit mechanisms and/or auditable events may be implemented in various different embodiments.

At least one embodiment is integrated with the data platform's SQL query processing platform, so consumers can directly use the results from clean rooms as inputs to arbitrary computations that the consumer wants to perform.

In some embodiments, data providers can create user interfaces as part of their applications. For example, a provider might wish to share aggregate data about individuals without revealing individual records. The provider can give consumers access to data in the form of a dashboard. The dashboard might include graphs and charts, and provide consumers with ways to customize the dashboard. For example, in an interactive dashboard, the consumer may be able to specify filters, grouping conditions/breakdowns, time ranges, and so forth, to customize the aggregate results that are displayed. In an embodiment, the underlying data for the dashboard comes from APIs of platform functions as described herein. The APIs may include parameters that the data consumer can set, through the dashboard, to customize the aggregate quantities that are returned. The APIs may also restrict how the data consumer can customize the dashboard. For example, the provider's code may prevent the consumer from setting filter conditions that could uniquely identify an individual.

Various TEE embodiments are discussed below. It is noted that the various possibilities and permutations described above in connection with common-platform embodiments could also be realized as TEE embodiments, other than any cases in which a given embodiment is possible in a common-platform scenario but not in a TEE scenario.

Figure 7:
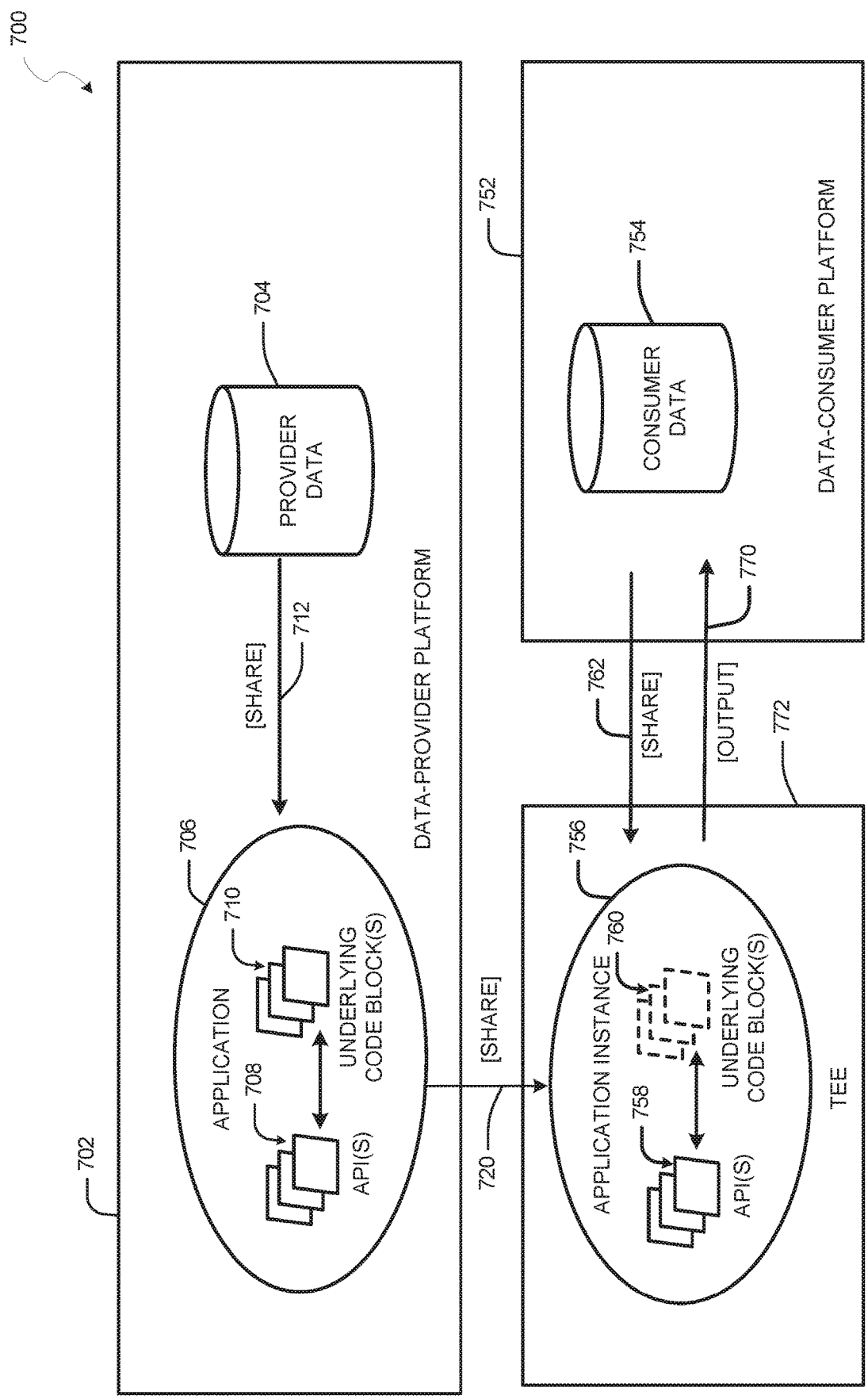
FIG. 7 depicts a second example defined-access data-clean-room scenario, in accordance with at least one embodiment.

FIG. 7 depicts an example defined-access data-clean-room scenario 700, in accordance with at least one embodiment. Depicted in FIG. 7 are representations of (i) a data-provider platform 702 corresponding with the above-described streaming-video platform and (ii) a data-consumer platform 752 corresponding with the above-described advertiser. The data-provider platform 702 includes provider data 704 and an application 706. The provider data 704 may include the data-provider data table 400 of FIG. 4. Furthermore, a share 712 is depicted to represent that at least some of the provider data 704 is shared with the application 706. In this example, the shared data is the data-provider data table 400.

Furthermore, the application 706 includes one or more APIs 708 that correspond with one or more respective underlying code blocks 710. These APIs 708 and associated underlying code blocks 710 could provide any of the operations described above, including queries, query operations (e.g., joins), user-defined functions, stored procedures, access to one or more secure views, generation of one or more user-interface elements, and/or the like. In at least one embodiment, the underlying code blocks 710 contain the source code and/or executable code that actually performs the operations that are accessible via the APIs 708.

A share 720 depicts that the data-provider platform 702 is sharing the application 706 with a TEE 772. In at least one embodiment, this involves installing an application instance 756 of the application 706 in the TEE 772. As can be seen in FIG. 7, the application instance 756 includes one or more APIs 758 that correspond to the one or more APIs 708 of the application 706. The APIs 758 respectively provide access to one or more underlying code blocks 760, which correspond to the one or more underlying code blocks 710 in the application 706. Whereas the underlying code blocks 710 (e.g., the underlying source code and/or executable code) are visible on the data-provider platform 702, the underlying code blocks 760 are not visible in the TEE 772 for this reason, the underlying code blocks 760 are depicted using dashed outlines in FIG. 7.

It can further be seen that a data-consumer platform 752 contains consumer data 754 which, in this example, includes the above-described data-consumer data table 450 of FIG. 4. The share 762 that is depicted in FIG. 7 represents that the data-consumer platform 752 is sharing at least some of the consumer data 754 with the application instance 756. It is noted with respect to both the provider data 704 and the consumer data 754 that their depiction as being respectively on the data-provider platform 702 and the data-consumer platform 752 are illustrative only, and do not necessarily reflect an actual storage location.

When the data-consumer platform 752 uses one or more of the APIs 758 of the application instance 556 in the TEE 772, any output of these operations is depicted as being stored back in the consumer data 754 on the data-consumer platform 752. The security of the consumer data 754 is protected in at least two ways: it is processed in the TEE 772, and the resulting output 770 is stored back to the data-consumer platform 752. In at least one embodiment, the shared provider data 704, the shared consumer data 754, the operations performed pursuant to the APIs 758, and the output 770 are all protected by homomorphic encryption, as described herein.

Figure 8:
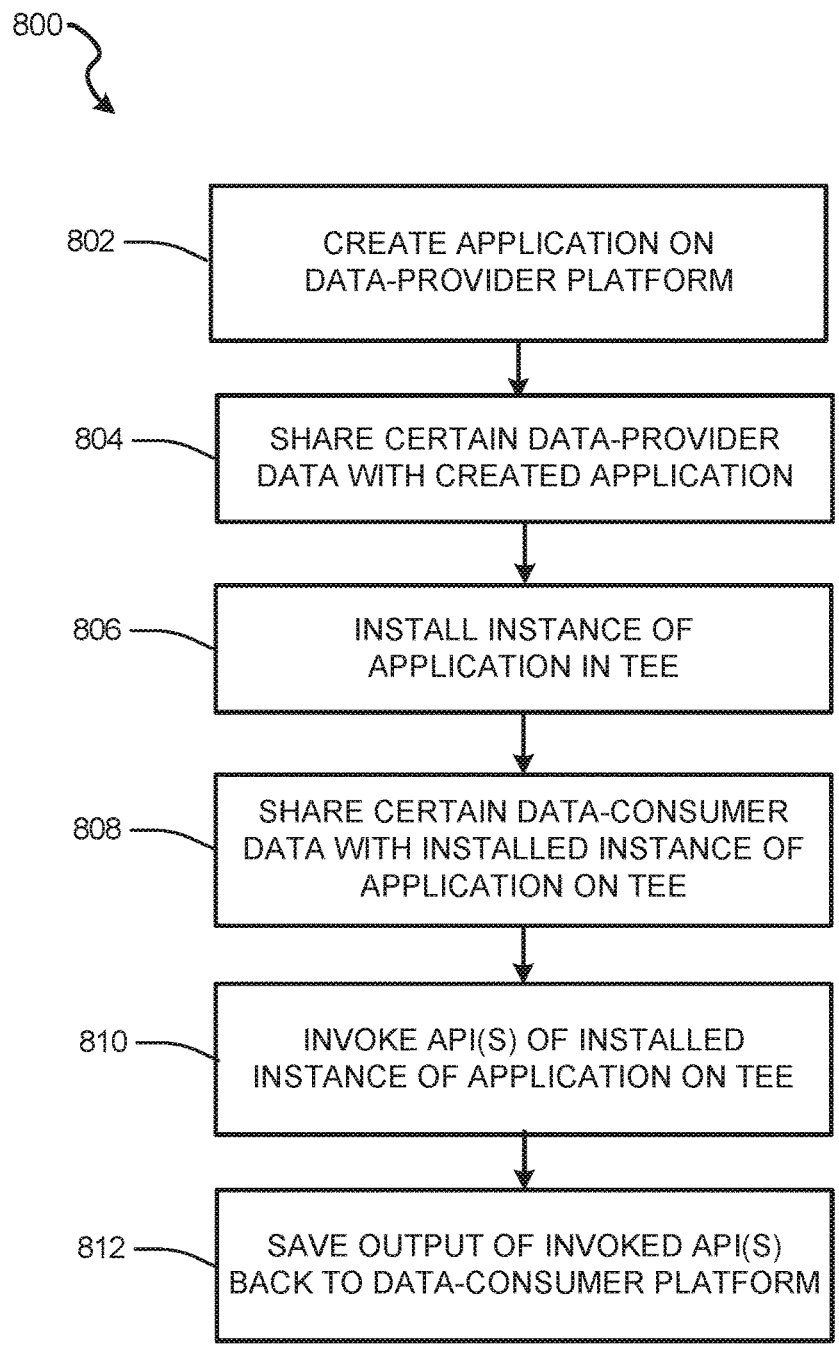
FIG. 8 shows a flow diagram of a second method for providing defined access in the context of a data clean room, in accordance with at least one embodiment.

FIG. 8 shows a flow diagram of a method 800 for providing defined access in the context of a data clean room, in accordance with at least one embodiment. The example method 800 is described by way of example as being performed in the context of FIG. 7, though this is by way of example and not limitation. Furthermore, the method 800 could be performed by any one or more computing devices that are suitably programmed to perform the described functions.

At operation 802, the application 706 is created on the data-provider platform 702. The application 706 includes one or more APIs 708 corresponding to one or more underlying code blocks 710.

At operation 804, the data-provider platform 702 shares (at the share 712) certain provider data 704 (e.g., the data-provider data table 400) with the application 706.

At operation 806, the data-provider platform 702 installs (in association with the share 720) an application instance 756 of the application 706 in the TEE 772. The application instance 756 includes APIs 758 that correspond to the APIs 708, and that also correspond to the (non-visible) underlying code blocks 760, which themselves correspond to the underlying code blocks 710.

At operation 808, the data-consumer platform 752 shares (at the share 762) certain consumer data 754 (e.g., the data-consumer data table 450) with the application instance 756 on the TEE 772.

At operation 810, the data-consumer platform 752 invokes one or more of the APIs 758 of the application instance 756 of the application 706 on the TEE 772.

At operation 812, the data-consumer platform 752 saves the output 770 of the APIs 758 locally on the data-consumer platform 752.

Below is a description of FIG. 9 and FIG. 10, which relate to cryptography embodiments. These are provided by way of example and not limitation. In the below description of FIG. 9 and FIG. 10, the example cryptographic mechanism that is utilized is FHE.

Figure 9:
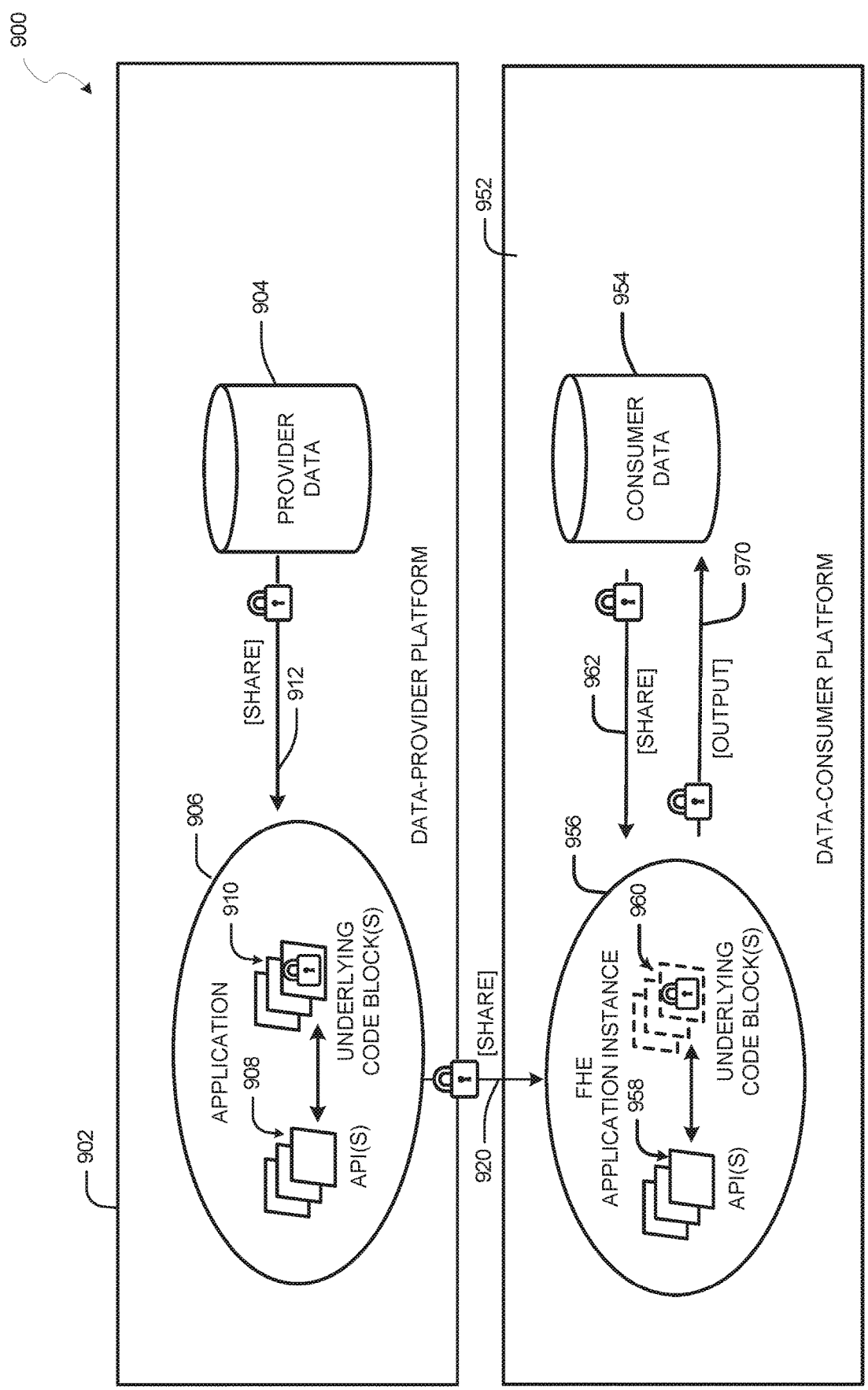
FIG. 9 depicts a third example defined-access data-clean-room scenario, in accordance with at least one embodiment.

FIG. 9 depicts an example defined-access data-cleanroom scenario 900, in accordance with at least one embodiment. Depicted in FIG. 9 are representations of (i) a data-provider platform 902 corresponding with the above-described streaming-video platform and (ii) a data-consumer platform 952 corresponding with the above-described advertiser. The data-provider platform 902 includes provider data 904 and an application 906. The provider data 904 may include the data-provider data table 400 of FIG. 4. Furthermore, a share 912 is depicted to represent that at least some of the provider data 904 is shared with the application 906, In this example, the shared data is the data-provider data table 400. Moreover, as indicated by the lock icon on the share 912, in this embodiment, the provider data that is shared by the share 912 is homomorphically encrypted with a public key provided to the data provider by the data consumer.

Furthermore, the application 906 includes one or more APIs 908 that correspond with one or more respective underlying code blocks 910 that implement cryptographic processing, in this case using FHE. These APIs 908 and associated underlying code blocks 910 could provide any of the operations described above, including queries, query operations (e.g., joins), user-defined functions, stored procedures, access to one or more secure views, generation of one or more user-interface elements, and/or the like. In at least one embodiment, the underlying code blocks 910 contain the source code and/or executable code that actually performs the operations that are accessible via the APIs 908. The lock icon on the underlying code blocks 910 indicates that the operations performed will be on homomorphically encrypted data, as described herein.

A share 920 depicts that the data-provider platform 902 is sharing the application 906 with the data-consumer platform 952. In at least one embodiment, the share 920 permits the installation in the data-consumer platform 952 of an application instance 956 of the application 906. The share 920 is depicted with a lock icon to indicate that, like the application 906, the application instance 956 also implements FHE.

As can be seen in FIG. 9, the application instance 956 includes one or more APIs 958 that correspond to the one or more APIs 908 of the application 906. The APIs 958 respectively provide access to one or more underlying code blocks 960, which correspond to the one or more underlying code blocks 910 in the application 906. Like the underlying code blocks 910 to which they correspond, the underlying code blocks 960 are also depicted with a lock icon to indicate that they operate on homomorphically encrypted data. Whereas the underlying code blocks 910 (e.g., the underlying source code and/or executable code) are visible to the data-provider platform 902, the underlying code blocks 960 are not visible to the data-consumer platform 952 for this reason, the underlying code blocks 960 are depicted using dashed outlines in FIG. 6.

It can further be seen that the data-consumer platform 952 contains consumer data 954 which, in this example, includes the above-described data-consumer data table 450 of FIG. 4, The share 962 that is depicted in FIG. 9 represents that the data-consumer platform 952 is sharing at least some of the consumer data 954 with the application instance 956. Moreover, the lock icon on the share 962 indicates that the data shared by the share 962 is homomorphically encrypted, in this example with the aforementioned public key generated by (or for) the data consumer. It is noted with respect to both the provider data 904 and the consumer data 954 that their depiction as being respectively within the data-provider platform 902 and the data-consumer platform 952 are illustrative only, and do not necessarily reflect an actual storage location.

When the data-consumer platform 952 uses one or more of the APIs 958 of the application instance 956, FHE processing is conducted such that the inputs to the APIs 958 are encrypted, as is the output 970 in at least one embodiment. The output 970 of these operations is depicted as being stored in the consumer data 954 of the data-consumer platform 952. The lock icon on the output 970 indicates that, in at least some embodiments, the output 970 is encrypted with, e.g., the public key of the data consumer. The data consumer may use the corresponding secret key to decrypt the output 970 for storage, substantive use, gaining insight, and/or the like.

Moreover, the data-consumer platform 952 may re-encrypt those decryption results for storage at rest, for transmission to another entity, etc. In at least some embodiments, the security of the consumer data 954 is protected in at least three ways: it never leaves the data-consumer platform 952, the resulting output 970 is locally stored in the data-consumer platform 952, and homomorphic encryption as described herein masks, in at least one embodiment, the substantive contents of the shared portion of the provider data 904, the shared portion of the consumer data 954, the operations of the underlying code blocks 960 at the behest of the APIs 958, and the output 970.

Figure 10:
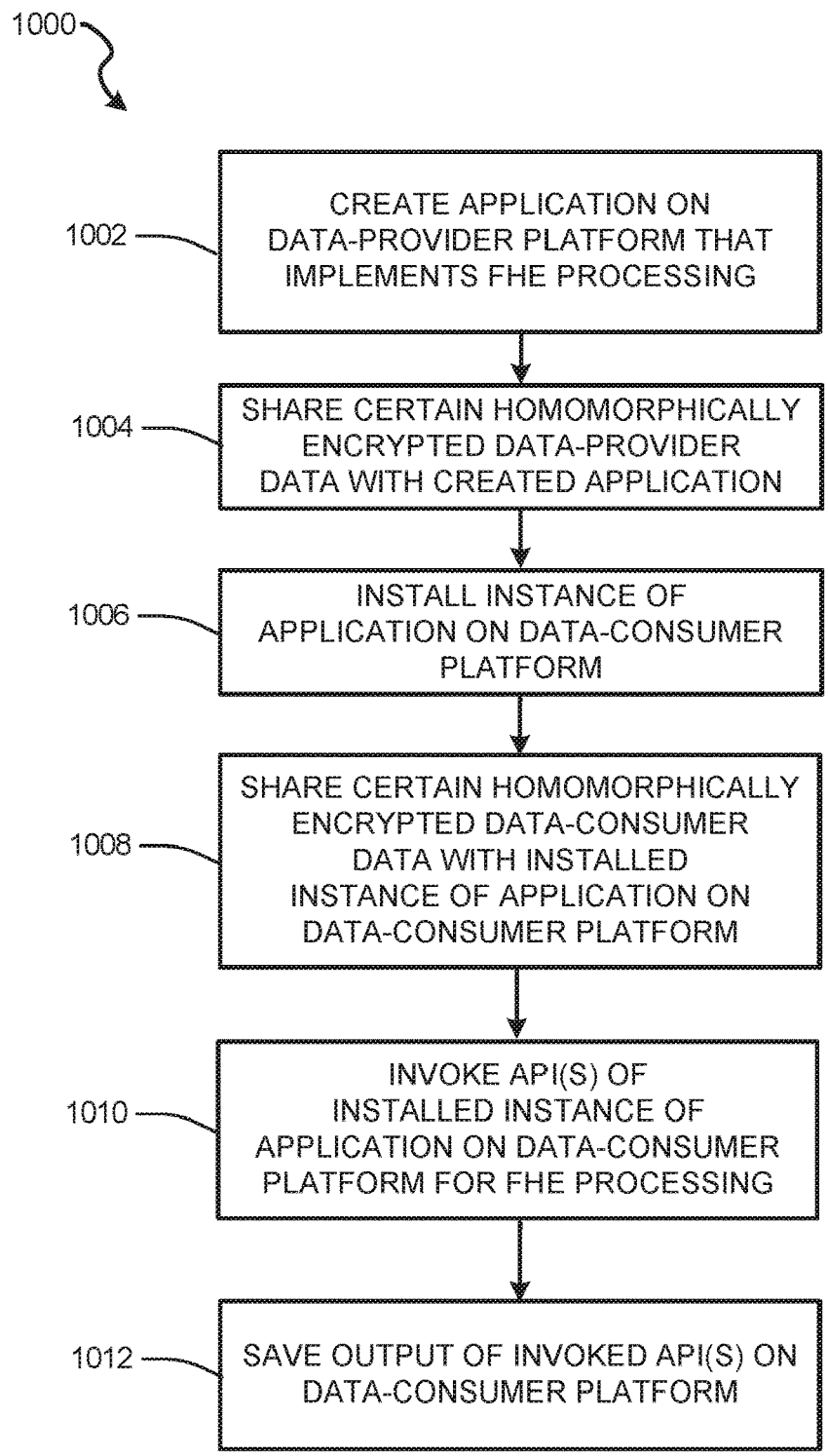
FIG. 10 shows a flow diagram of a third method for providing defined access in the context of a data clean room, in accordance with at least one embodiment.

FIG. 10 shows a flow diagram of a third method for providing defined access in the context of a data clean room, in accordance with at least one embodiment. In particular, FIG. 10 depicts an example method 1000 that implements FHE as described herein.

At operation 1002, the application 906 is created on the data-provider platform 902. The application 906 includes one or more APIs 908 corresponding to one or more underlying code blocks 910, which are configured to be able to operate on homomorphically encrypted data, as described herein.

At operation 1004, the data-provider platform 902 shares (at the share 912) certain provider data 904 (e.g., the data-provider data table 400) with the application 906. In at least some embodiments, the shared portion of the provider data 904 is homomorphically encrypted with, e.g., a public key provided by the data consumer.

At operation 1006, the data-provider platform 902 installs (in association with the share 920) an application instance 956 of the application 906 in the data-consumer platform 952. The application instance 956 includes APIs 958 that correspond to the APIs 908, and that also correspond to the (non-visible) underlying code blocks 960, which themselves correspond to the underlying code blocks 910, and implement FHE processing as described herein.

At operation 1008, the data-consumer platform 952 shares (at the share 962) certain consumer data 954 (e.g., the data-consumer data table 450) with the application instance 956. The shared portion of the consumer data 954 may also be homomorphically encrypted, in an example with the aforementioned public key of the data consumer.

At operation 1010, the data-consumer platform 952 invokes one or more of the APIs 958 of the application instance 956 of the application 906, resulting in one or more of the underlying code blocks 960 operating on homomorphically encrypted data.

At operation 1012, the data-consumer platform 952 saves the output 970 of the APIs 958 locally within the data-consumer platform 952. As described above, the output 970 may also be homomorphically encrypted with the public key of the data consumer, where only the data consumer possesses the corresponding secret key needed to decrypt the output 970.

Figure 11:
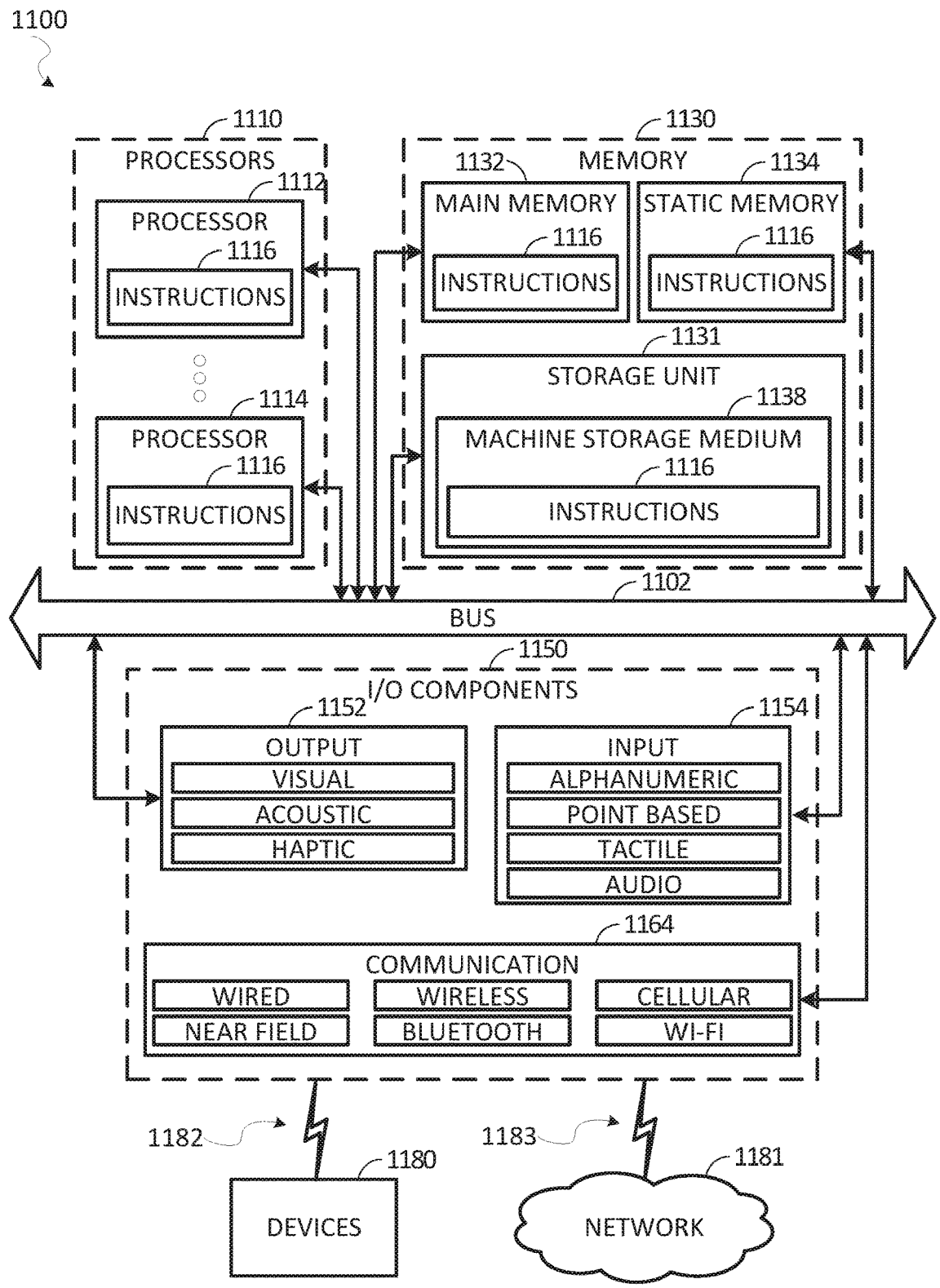
FIG. 11 illustrates a diagrammatic representation of a machine in the form of a computer system within which a set of instructions may be executed for causing the machine to perform any one or more of the methodologies discussed herein, in accordance with at least one embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code), for causing the machine 1100 to perform any one or more of the methodologies discussed herein, may be executed. For example, the instructions 1116 may cause the machine 1100 to execute any one or more operations of any one or more of the methods described herein, by one or more processors. As another example, the instructions 1116 may cause the machine 1100 to implement portions of the data flows described herein, in this way, the instructions 1116 transform a general, non-programmed machine into a particular machine 1100 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously, Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1131, all accessible to the processors 1110 such as via the bus 1102. The main memory 1132, the static memory 1134, and the storage unit 1131 comprise a machine storage medium 1138 that may store the instructions 1116 embodying any one or more of the methodologies or functions described herein. The instructions 1116 may also reside, completely or partially, within the main memory 1132, within the static memory 1134, within the storage unit 1131, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines, such as mobile phones, will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154.

The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1181 via a coupling 1183 or to devices 1180 via a coupling 1182. For example, the communication components 1164 may include a network interface component or another suitable device to interface with the network 1181. In further examples, the communication components 1164 may include wired communication components, wireless communication components, cellular communication components, and other communication components to provide communication via other modalities. The devices 1180 may be another machine or any of a wide variety of peripheral devices (e.g., a peripheral device coupled via a universal serial bus (USB)). For example, as noted above, the machine 1100 may correspond to any one of the client device 114, the compute service manager 108, and the execution platform 110, and may include any other of these systems and devices.

The various memories (e.g., 1130, 1132, 1134, and/or memory of the processor(s) 1110 and/or the storage unit 1136) may store one or more sets of instructions 1116 and data structures (e.g., software), embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to; solid-state memories; and optical and magnetic media, including memory internal or external to processors. Specific examples of machine-storage media, computer-storage media; and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1181 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1181 or a portion of the network 1181 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1181 using a transmission medium via a network interface device (e.g., a network interface component included in the communication components 1164), and utilizing any one of a number of well-known transfer protocols (e.g., hypertext transfer protocol (HTTP)). Similarly, the instructions 1116 may be transmitted or received using a transmission medium via the coupling 1182 (e.g., a peer-to-peer coupling) to the devices 1180. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

In view of the disclosure above, a listing of various examples of embodiments is set forth below. It should be noted that one or more features of an example, taken in isolation or combination, should be considered to be within the disclosure of this application.

Example 1 is a method performed by executing instructions on at least one hardware processor, the method including: creating an application on a data-provider platform, the application including one or more application programming interfaces (APIs) corresponding to one or more underlying code blocks; sharing provider data with the application on the data-provider platform; installing, in a trusted execution environment (TEE), an application instance of the application, the application instance including one or more APIs corresponding to the one or more APIs in the application on the data-provider platform; sharing consumer data with the application instance from a data-consumer platform; invoking one or more of the APIs of the application instance to execute respective associated underlying code blocks on the TEE, the respective associated underlying code blocks not being visible on the TEE; and saving output of the one or more respective associated underlying code blocks to the data-consumer platform.

Example 2 is the method of Example 1, where the application instance is, by default, not authorized to exfiltrate consumer data from the data-consumer platform.

Example 3 is the method of Example 1 or Example 2, where the respective associated underlying code blocks not being visible on the TEE includes a source code of the respective associated underlying code blocks not being visible on the TEE.

Example 4 is the method of any of the Examples 1-3, where the saved output includes aggregated output data.

Example 5 is the method of Example 4, where the saved output does not include any of the shared provider data.

Example 6 is the method of any of the Examples 1-5, where the saved output includes a relation.

Example 7 is the method of Example 6, where the relation includes only a subset of the consumer data that was shared with the application instance.

Example 8 is a computer system including: at least one hardware processor; and one or more non-transitory computer readable storage media containing instructions that, when executed by the at least one hardware processor, cause the computer system to perform operations including: creating an application on a data-provider platform, the application including one or more application programming interfaces (APIs) corresponding to one or more underlying code blocks; sharing provider data with the application on the data-provider platform; installing, in a trusted execution environment (TEE), an application instance of the application, the application instance including one or more APIs corresponding to the one or more APIs in the application on the data-provider platform; sharing consumer data with the application instance from a data-consumer platform; invoking one or more of the APIs of the application instance to execute respective associated underlying code blocks on the TEE, the respective associated underlying code blocks not being visible on the TEE; and saving output of the one or more respective associated underlying code blocks to the data-consumer platform.

Example 9 is the computer system of Example 8, where the application instance is, by default, not authorized to exfiltrate consumer data from the data-consumer platform.

Example 10 is the computer system of Example 8 or Example 9, where the respective associated underlying code blocks not being visible on the TEE includes a source code of the respective associated underlying code blocks not being visible on the TEE.

Example 11 is the computer system of any of the Examples 8-10, where the saved output includes aggregated output data.

Example 12 is the computer system of Example 11, where the saved output does not include any of the shared provider data.

Example 13 is the computer system of any of the Examples 8-12, where the saved output includes a relation.

Example 14 is the computer system of Example 13, where the relation includes only a subset of the consumer data that was shared with the application instance.

Example 15 is one or more non-transitory computer readable storage media containing instructions that, when executed by at least one hardware processor of a computer system, cause the computer system to perform operations including: creating an application on a data-provider platform, the application including one or more application programming interfaces (APIs) corresponding to one or more underlying code blocks; sharing provider data with the application on the data-provider platform; installing, in a trusted execution environment (TEE), an application instance of the application, the application instance including one or more APIs corresponding to the one or more APIs in the application on the data-provider platform; sharing consumer data with the application instance from a data-consumer platform; invoking one or more of the APIs of the application instance to execute respective associated underlying code blocks on the TEE, the respective associated underlying code blocks not being visible on the TEE; and saving output of the one or more respective associated underlying code blocks to the data-consumer platform.

Example 16 is the one or more non-transitory computer readable storage media of Example 15, where the application instance is, by default, not authorized to exfiltrate consumer data from the data-consumer platform.

Example 17 is the one or more non-transitory computer readable storage media of Example 15 or Example 16, where the respective associated underlying code blocks not being visible on the TEE includes a source code of the respective associated underlying code blocks not being visible on the TEE.

Example 18 is the one or more non-transitory computer readable storage media of any of the Examples 15-18, where the saved output includes aggregated output data.

Example 19 is the one or more non-transitory computer readable storage media of Example 18, where the saved output does not include any of the shared provider data.

Example 20 is the one or more non-transitory computer readable storage media of any of the Examples 15-19, where the saved output includes a relation.

Example 21 is the one or more non-transitory computer readable storage media of Example 20, where the relation includes only a subset of the consumer data that was shared with the application instance.

In at least one embodiment, the application is already in the data-provider account, and need not be created as part of an embodiment.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method performed by executing instructions on at least one hardware processor, the method comprising:
    creating an application in a data-provider account of a data platform, the application comprising one or more application programming interfaces (APIs) corresponding to one or more underlying code blocks;
    sharing homomorphically encrypted provider data with the application in the data-provider account;
    installing, in a data-consumer account of the data platform, an application instance of the application, the application instance comprising one or more APIs corresponding to the one or more APIs in the application in the data-provider account;
    sharing homomorphically encrypted consumer data with the application instance in the data-consumer account;
    invoking one or more of the APIs of the application instance to execute respective associated underlying code blocks, the respective associated underlying code blocks not being visible to the data-consumer account, the respective associated underlying code blocks not being visible to the data-consumer account comprising a source code of the respective associated underlying code blocks not being visible to the data-consumer account, the one or more executed underlying code blocks operating on the shared homomorphically encrypted provider data and the shared homomorphically encrypted consumer data; and
    saving homomorphically encrypted output of the one or more respective associated underlying code blocks locally within the data-consumer account, the shared homomorphically encrypted provider data, the shared homomorphically encrypted consumer data, and the homomorphically encrypted output each being homomorphically encrypted using a public key generated by the data-consumer account.

2. The method of claim Hai, further comprising the data-consumer account sharing the public key with the data-provider account.

3. The method of claim 1, wherein the application instance is, by default, not authorized to exfiltrate consumer data from the data-consumer account.

4. The method of claim 1, wherein the saved homomorphically encrypted output comprises aggregated output data.

5. The method of claim 4, wherein the saved homomorphically encrypted output does not include any of the shared provider data.

6. The method of claim 1, wherein the saved homomorphically encrypted output comprises a relation.

7. The method of claim 6, wherein the relation includes only a subset of the shared homomorphically encrypted consumer data.

8. The method of claim 1, further comprising locally decrypting the homomorphically encrypted output for storage in the data-consumer account.

9. A data platform comprising:
    at least one hardware processor; and
    one or more non-transitory computer readable storage media containing instructions that, when executed by the at least one hardware processor, cause the data platform to perform operations comprising:
        creating an application in a data-provider account of a data platform, the application comprising one or more application programming interfaces (APIs) corresponding to one or more underlying code blocks;
        sharing homomorphically encrypted provider data with the application in the data-provider account;
        installing, in a data-consumer account of the data platform, an application instance of the application, the application instance comprising one or more APIs corresponding to the one or more APIs in the application in the data-provider account;
        sharing homomorphically encrypted consumer data with the application instance in the data-consumer account;
        invoking one or more of the APIs of the application instance to execute respective associated underlying code blocks, the respective associated underlying code blocks not being visible to the data-consumer account, the respective associated underlying code blocks not being visible to the data-consumer account comprising a source code of the respective associated underlying code blocks not being visible to the data-consumer account, the one or more executed underlying code blocks operating on the shared homomorphically encrypted provider data and the shared homomorphically encrypted consumer data; and saving homomorphically encrypted output of the one or more respective associated underlying code blocks locally within the data-consumer account, the shared homomorphically encrypted provider data, the shared homomorphically encrypted consumer data, and the homomorphically encrypted output each being homomorphically encrypted using a public key generated by the data-consumer account.

10. The data platform of claim 9, the operations further comprising the data-consumer account sharing the public key with the data-provider account.

11. The data platform of claim 9, wherein the application instance is, by default, not authorized to exfiltrate consumer data from the data-consumer account.

12. The data platform of claim 9, wherein the saved homomorphically encrypted output comprises aggregated output data.

13. The data platform of claim 12, wherein the saved homomorphically encrypted output does not include any of the shared provider data.

14. The data platform of claim 9, wherein the saved homomorphically encrypted output comprises a relation.

15. The data platform of claim 14, wherein the relation includes only a subset of the shared homomorphically encrypted consumer data.

16. The data platform of claim 9, the operations further comprising locally decrypting the homomorphically encrypted output for storage in the data-consumer account.

17. One or more non-transitory computer readable storage media containing instructions that, when executed by at least one hardware processor of a computer system, cause the computer system to perform operations comprising:

creating an application in a data-provider account of a data platform, the application comprising one or more application programming interfaces (APIs) corresponding to one or more underlying code blocks;

sharing homomorphically encrypted provider data with the application in the data-provider account;

installing, in a data-consumer account of the data platform, an application instance of the application, the application instance comprising one or more APIs corresponding to the one or more APIs in the application in the data-provider account;

sharing homomorphically encrypted consumer data with the application instance in the data-consumer account;

invoking one or more of the APIs of the application instance to execute respective associated underlying code blocks, the respective associated underlying code blocks not being visible to the data-consumer account, the respective associated underlying code blocks not being visible to the data-consumer account comprising a source code of the respective associated underlying code blocks not being visible to the data-consumer account, the one or more executed underlying code blocks operating on the shared homomorphically encrypted provider data and the shared homomorphically encrypted consumer data; and saving homomorphically encrypted output of the one or more respective associated underlying code blocks locally within the data-consumer account, the shared homomorphically encrypted provider data, the shared homomorphically encrypted consumer data, and the homomorphically encrypted output each being homomorphically encrypted using a public key generated by the data-consumer account.

18. The one or more non-transitory computer readable storage media of claim 17, the operations further comprising the data-consumer account sharing the public key with the data-provider account.

19. The one or more non-transitory computer readable storage media of claim 17, wherein the application instance is, by default, not authorized to exfiltrate consumer data from the data-consumer account.

20. The one or more non-transitory computer readable storage media of claim 17, wherein the saved homomorphically encrypted output comprises aggregated output data.

21. The one or more non-transitory computer readable storage media of claim 20, wherein the saved homomorphically encrypted output does not include any of the shared provider data.

22. The one or more non-transitory computer readable storage media of claim 17, wherein the saved homomorphically encrypted output comprises a relation.

23. The one or more non-transitory computer readable storage media of claim 22, wherein the relation includes only a subset of the shared homomorphically encrypted consumer data.

24. The one or more non-transitory computer readable storage media of claim 17, the operations further comprising locally decrypting the homomorphically encrypted output for storage in the data-consumer account.

* * * * *

UNITED STATES PATENT AND TRADEMARK OFFICE
CERTIFICATE OF CORRECTION

PATENT NO. : 11,763,029 B2  
APPLICATION NO. : 18/162506  
DATED : September 19, 2023  
INVENTOR(S) : Avanes et al.

Page 1 of 1

It is certified that error appears in the above-identified patent and that said Letters Patent is hereby corrected as shown below:

In the Claims

In Column 28, Line 25, in Claim 2, delete "Hai," and insert --1,-- therefor

Signed and Sealed this  
Seventh Day of January, 2025

Derrick Brent  
*Acting Director of the United States Patent and Trademark Office*